(12) United States Patent  (10) Patent No.: US 9,145,144 B2
Friend et al.  (45) Date of Patent: Sep. 29, 2015

(54) INCLINATION DETECTION SYSTEMS AND METHODS

(75) Inventors: Paul Russell Friend, Morton, IL (US); Drew Alan Fehr, Washington, IL (US); Frank Arthur Willis, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 955 days.

(21) Appl. No.: 13/247,368

(22) Filed: Sep. 28, 2011

(65) Prior Publication Data

US 2013/0079949 A1   Mar. 28, 2013

(51) Int. Cl.
*B60W 40/076* (2012.01)
*B60W 30/04* (2006.01)

(52) U.S. Cl.
CPC ........ *B60W 40/076* (2013.01); *B60W 2030/043* (2013.01); *B60W 2520/105* (2013.01); *B60Y 2200/25* (2013.01); *B60Y 2200/411* (2013.01)

(58) Field of Classification Search
USPC ............................................................ 701/1
See application file for complete search history.

(56) References Cited

U.S. PATENT DOCUMENTS

| | | | |
|---|---|---|---|
| 4,531,300 A * | 7/1985 | Heidel et al. | 33/366.13 |
| 5,265,472 A | 11/1993 | Pfeifle et al. | |
| 5,860,480 A | 1/1999 | Jayaraman et al. | |
| 6,332,353 B1 | 12/2001 | Gesele et al. | |
| 6,481,295 B1 | 11/2002 | Schoch | |
| 6,502,055 B1 | 12/2002 | Reiner et al. | |
| 6,622,091 B2 | 9/2003 | Perlmutter et al. | |
| 6,810,738 B2 | 11/2004 | Sakaguchi | |
| 6,928,382 B2 | 8/2005 | Hong et al. | |
| 7,206,694 B2 | 4/2007 | Huddle et al. | |
| 7,289,898 B2 | 10/2007 | Hong et al. | |
| 7,650,252 B2 * | 1/2010 | Douglas | 702/95 |
| 7,650,752 B2 | 1/2010 | Oohara | |
| 8,033,751 B2 * | 10/2011 | Yost | 404/84.05 |
| 8,219,451 B2 | 7/2012 | Kreidler et al. | |
| 8,340,860 B2 | 12/2012 | Kobayashi et al. | |
| 8,380,458 B2 | 2/2013 | Wengler | |
| 8,566,034 B1 * | 10/2013 | Van Wyck Loomis | 701/480 |
| 2002/0002859 A1 | 1/2002 | Gesele et al. | |
| 2004/0007064 A1 | 1/2004 | Sakaguchi | |
| 2006/0129291 A1 * | 6/2006 | Lu et al. | 701/36 |

(Continued)

OTHER PUBLICATIONS

Office Action issued Dec. 18, 2013, in U.S. Appl. No. 13/247,679.

(Continued)

*Primary Examiner* — Shelley Chen
(74) *Attorney, Agent, or Firm* — Finnegan, Henderson, Farabow, Garrett & Dunner, LLP

(57) ABSTRACT

An inclination detection system is disclosed. The inclination detection system may have an inclination angle predictor configured to calculate an a priori estimated inclination angle of the machine based on a previously estimated inclination angle, and a measurement variance calculator configured to calculate a measurement variance of the a priori estimated inclination angle based on a non-gravitational acceleration of the machine. The inclination detection system may also have an inclination angle sensor configured to measure a measured inclination angle of the machine, and an inclination angle updater configured to determine an a posteriori estimated inclination angle of the machine based on the a priori estimated inclination angle, the measurement variance of the a priori estimated inclination angle, and the measured inclination angle.

20 Claims, 7 Drawing Sheets

(56) References Cited

U.S. PATENT DOCUMENTS

| | | |
|---|---|---|
| 2006/0293826 A1 | 12/2006 | Hong et al. |
| 2008/0086248 A1* | 4/2008 | Lu et al. .................. 701/41 |
| 2008/0319589 A1* | 12/2008 | Lee et al. .................. 701/1 |
| 2009/0043473 A1* | 2/2009 | Nakai et al. ................ 701/70 |
| 2009/0312974 A1* | 12/2009 | Douglas .................. 702/93 |
| 2010/0057360 A1* | 3/2010 | Ohkubo .................. 701/220 |
| 2010/0250117 A1 | 9/2010 | Deker et al. |
| 2010/0299044 A1* | 11/2010 | Miyake et al. .............. 701/96 |
| 2011/0035091 A1* | 2/2011 | Yamamoto ................ 701/29 |
| 2011/0066377 A1* | 3/2011 | Takaoka .................. 701/220 |
| 2011/0098884 A1* | 4/2011 | Doi .................. 701/36 |
| 2011/0125454 A1 | 5/2011 | Wengler |
| 2011/0208402 A1* | 8/2011 | Sladek, Jr. .................. 701/102 |
| 2012/0150294 A1 | 6/2012 | Weinberg et al. |
| 2012/0253585 A1 | 10/2012 | Harvie |
| 2013/0080112 A1* | 3/2013 | Friend .................. 702/154 |

OTHER PUBLICATIONS

"MEMS Capacitive Accelerometers, Application Notes Tilt/Inclination Sensing," Colibrys, Inc., www.colibrys.com (2 pages).

Final Office Action issued Apr. 11, 2014, in U.S. Appl. No. 13/247,679.

Office Action issued Aug. 18, 2014, in U.S. Appl. No. 13/247,679.

* cited by examiner

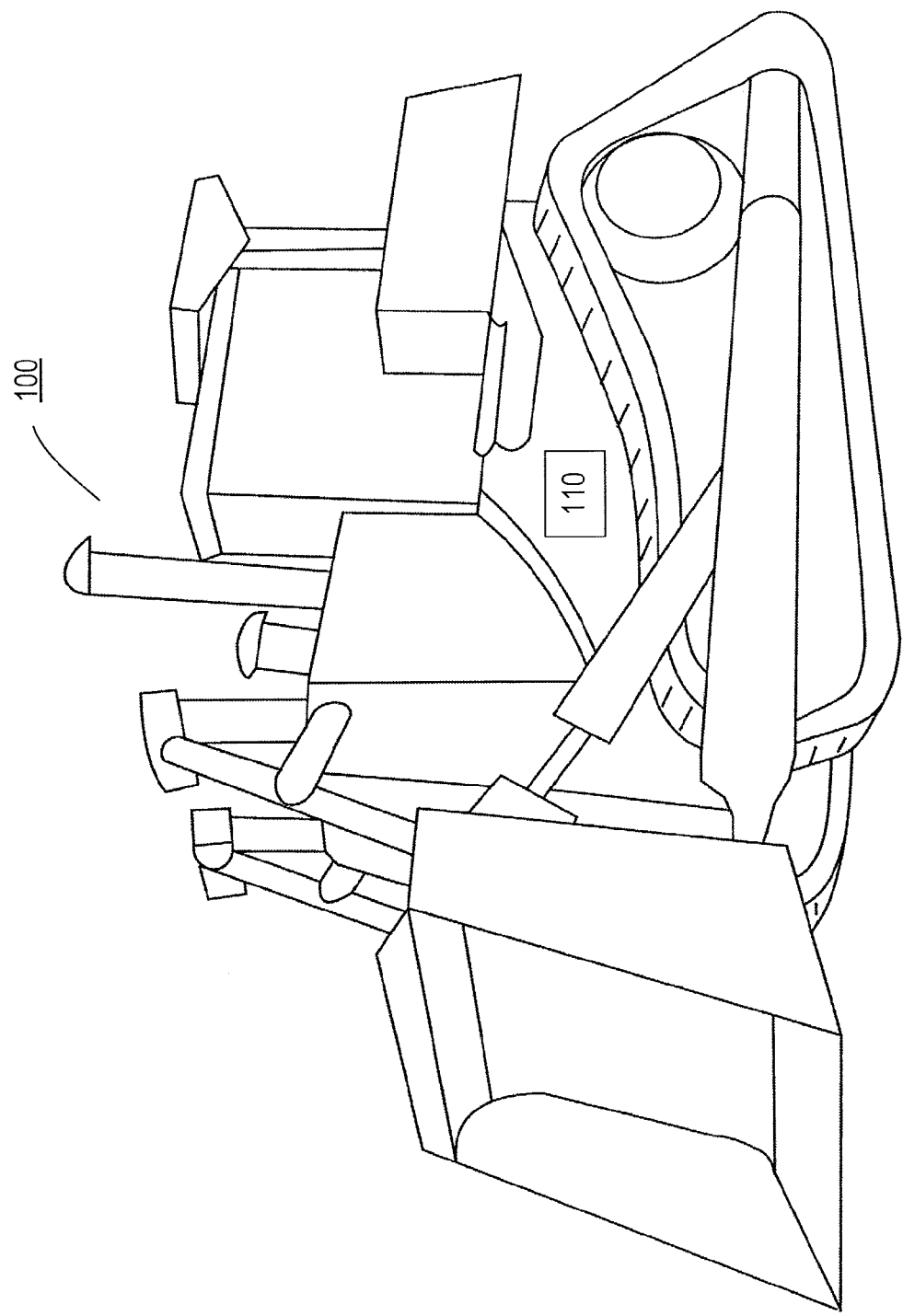

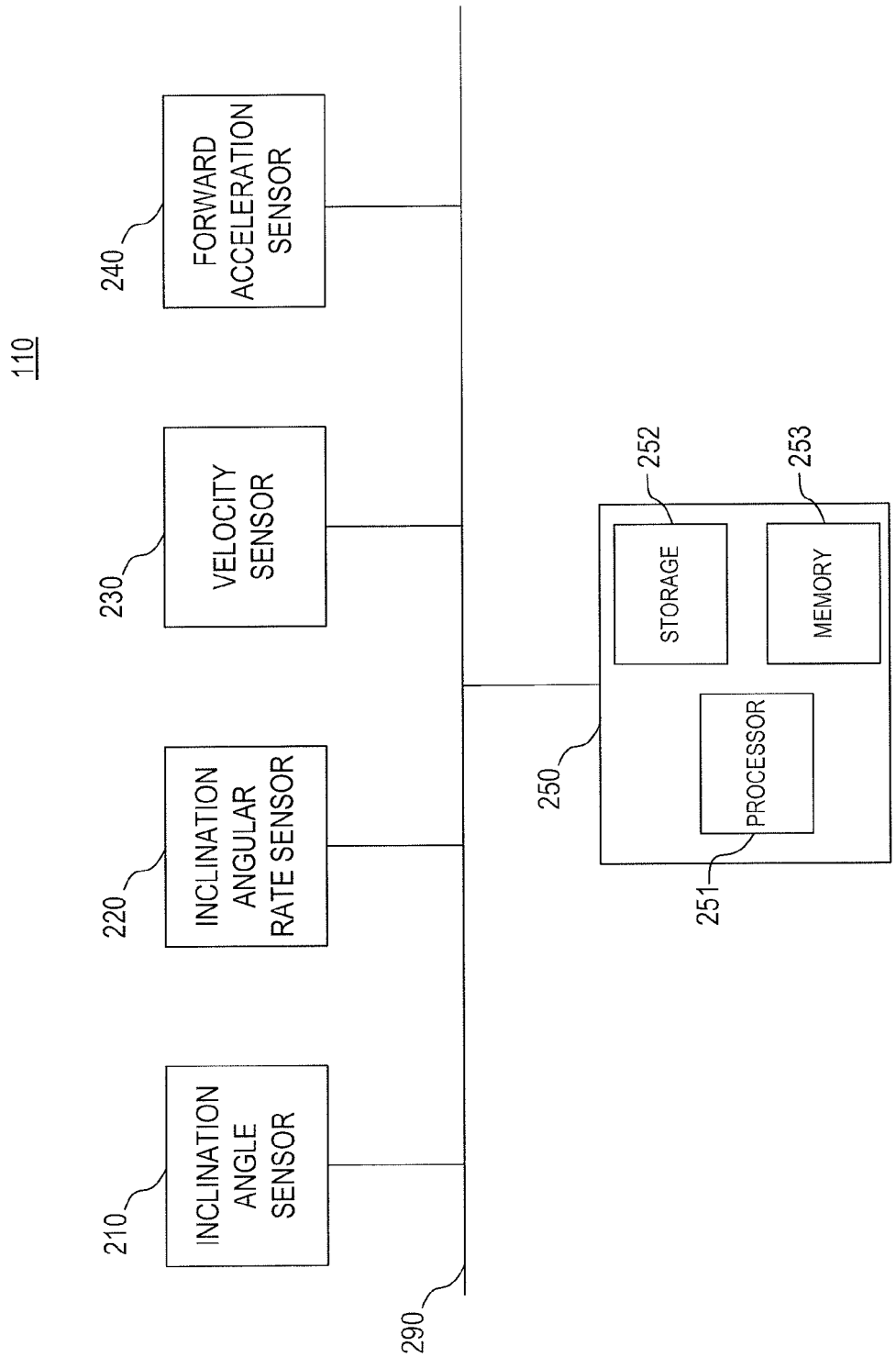

INCLINATION DETECTION SYSTEMS AND METHODS

TECHNICAL FIELD

The present disclosure relates generally to a detection system and, more particularly, to an inclination detection system having acceleration compensation.

BACKGROUND

Machines such as, for example, dozers, motor graders, wheel loaders, wheel tractor scrapers, and other types of heavy equipment are used to perform a variety of tasks. The completion of some of these tasks require operation on or near inclines that, if inappropriately traversed by a machine, have the potential to roll the machine over, resulting in equipment damage and possible injury to the operator. When under the direct control of a human operator, the likelihood of rollover may be estimated by the operator and appropriate avoidance measures manually implemented. However, in some situations, rollover may be difficult for the operator to anticipate and, without suitable automated safety measures in place, rollover may be unavoidable. This rollover potential may be even greater when the machine is remotely, autonomously, or semi-autonomously controlled.

Remotely controlled, autonomously controlled, and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable.

An exemplary system that may be used to control a machine is disclosed in U.S. Pat. No. 6,622,091 to Perlmutter et al. that issued on Sep. 16, 2003 ("the '091 patent"). The system of the '091 patent is capable of determining an inclination of a machine. Specifically, the system combines outputs from various sensors, including accelerometers, via a Kalman filter to generate corrected navigation data (including corrected pitch data) of a machine. Using the corrected navigation data from the Kalman filter, the system computes updated navigation data related to a machine.

Although the system of the '091 patent may be useful in determining navigational data for a machine, the system may not provide accurate inclination (e.g., pitch) data due to unexpected non-gravitational accelerations of the machine. For example, acceleration caused by other means such as machine movement or vibration may cause errors in the data obtained by the accelerometers. Further, non-gravitational acceleration may cause the Kalman filter in the '091 patent to incorrectly compensate when generating the corrected pitch data.

The inclination detection system of the present disclosure is directed toward solving one or more of the problems set forth above and/or other problems of the prior art.

SUMMARY

In one aspect, the present disclosure is directed to an inclination detection system. The inclination detection system may include an inclination angle predictor configured to calculate an a priori estimated inclination angle of the machine based on a previously estimated inclination angle, and a measurement variance calculator configured to calculate a measurement variance of the a priori estimated inclination angle based on a non-gravitational acceleration of the machine. The inclination detection system may also include an inclination angle sensor configured to measure a measured inclination angle of the machine, and an inclination angle updater configured to determine an a posteriori estimated inclination angle of the machine based on the a priori estimated inclination angle, the measurement variance of the a priori estimated inclination angle, and the measured inclination angle.

In another aspect, the present disclosure is directed to a computer-implemented method of detecting inclination. The method may include calculating an a priori estimated inclination angle of the machine based on a previously estimated inclination angle, and calculating a measurement variance of the a priori estimated inclination angle based on a non-gravitational acceleration of the machine. The method may also include measuring a measured inclination angle of the machine, and determining an a posteriori estimated inclination angle of the machine based on the a priori estimated inclination angle, the measurement variance of the a priori estimated inclination angle, and the measured inclination angle.

In yet another aspect, the present disclosure is directed to a computer-readable storage device storing instruction for determining an inclination angle of a machine. The instructions may cause one or more computer processors to calculate an a priori estimated inclination angle of the machine based on a previously estimated inclination angle, and calculate a measurement variance of the a priori estimated inclination angle based on a non-gravitational acceleration of the machine. The instructions may further cause one or more computer processors to receive a measured inclination angle of the machine, and determine an a posteriori estimated inclination angle of the machine based on the a priori estimated inclination angle, the measurement variance of the a priori estimated inclination angle, and the measured inclination angle.

BRIEF DESCRIPTION OF THE DRAWINGS

FIG. 1 is a pictorial illustration of an exemplary disclosed machine;

FIG. 2 is a diagrammatic illustration of an exemplary disclosed inclination detection system that may be used in conjunction with the machine of FIG. 1;

DETAILED DESCRIPTION

Figure 3A:
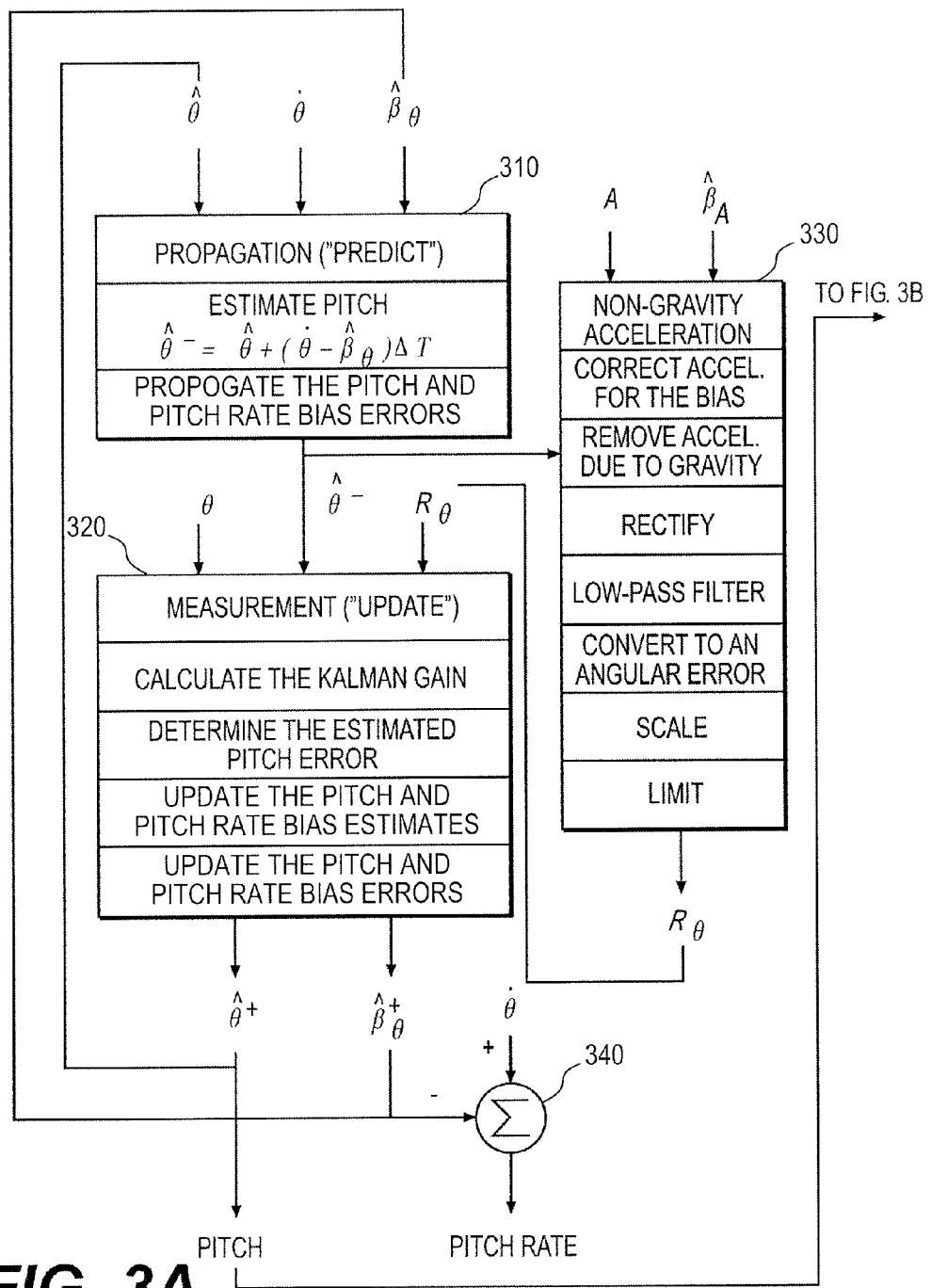
FIGS. 3A and 3B are diagrammatic illustrations of an exemplary disclosed inclination detection device that may be used in conjunction with the machine of FIG. 1.

FIG. 1 illustrates a machine 100 having an exemplary disclosed inclination detection system 110. Machine 100 may embody a machine configured to perform some type of operation associated with an industry such as mining, construction, farming, transportation, power generation, or any other industry known in the art. For example, machine 100 may be an earth moving machine such as a haul truck, a dozer, a loader, a backhoe, an excavator, a motor grader, a wheel tractor scraper or any other earth moving machine.

Inclination detection system 110 may include components that cooperate to gather information from machine 100 during operation of machine 100. For example, inclination detection system 110 may include various sensors, e.g., accelerometers, gyroscopes, global positioning system (GPS) devices, radar devices, etc., that may be used to measure, e.g., location, horizontal, vertical, and forward velocities and accelerations, inclination angle (e.g., pitch), inclination angular rate, heading, yaw rate, roll angle, roll rate, etc. Inclination detection system 110 may also include any combination of hardware and/or software capable of executing one or more computer programs that may include algorithms, such as a Kalman filter algorithm, to process the measurements made by the various sensors.

FIG. 2 illustrates an exemplary inclination detection system 110 that may be used in conjunction with machine 100. Inclination detection system 110 may include an inclination angle sensor 210, an inclination angular rate sensor 220, a velocity sensor 230, a forward acceleration sensor 240, and a controller 250 connected to each other via bus 290. While a bus architecture is shown in FIG. 2, any suitable architecture may be used, including any combination of wired and/or wireless networks. Additionally, such networks may be integrated into any local area network, wide area network, and/or the Internet.

Inclination angle sensor 210 may include any device capable of measuring the inclination angle, e.g., pitch, of a machine. For example, inclination angle sensor 210 may include one or more accelerometers and/or pendulous-based inclinometers capable of measuring the inclination angle of a machine along one or more axes. Similarly, inclination angular rate sensor 220 may include any device capable of measuring the inclination angular rate of change, e.g., pitch rate, of a machine. For example, inclination angular rate sensor 220 may include one or more accelerometers and/or gyroscopes. Inclination angle rate sensor 220 may also include hardware and/or software capable of calculating inclination angular rate values from a time series output of inclination angle sensor 210. In certain embodiments, inclination angle sensor 210 and inclination angular rate sensor 220 may be incorporated in a single sensor.

Velocity sensor 230 may include any device capable of measuring a machine's velocity. For example, velocity sensor 230 may include one or more global positioning system (GPS) receivers, one or more radar-based devices, one or more sensors positioned on a wheel or axle of machine 100, one or more sensors or other devices for measuring transmission speed, etc. Forward acceleration sensor 240 likewise may include any device capable of measuring a machine's forward acceleration. For example, acceleration sensor 240 may include one or more accelerometers and/or may include hardware and/or software capable of calculating acceleration values from a time series output of velocity sensor 230.

Controller 250 may include processor 251, storage 252, and memory 253, included together in a single device and/or provided separately. Processor 251 may include one or more known processing devices, such as a microprocessor from the Pentium™ or Xeon™ family manufactured by Intel™, the Turion™ family manufactured by AMD™, any of various processors manufactured by Sun Microsystems, or any other type of processor. Memory 253 may include one or more storage devices configured to store information used by controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one embodiment, memory 253 may include one or more inclination angle detection programs or subprograms loaded from storage 252 or elsewhere that, when executed by processor 251, perform various procedures, operations, or processes consistent with disclosed embodiments. For example, memory 253 may include one or more programs that enable controller 250 to, among other things, collect data from sensors 210-240, process the data according to disclosed embodiments such as those embodiments discussed with regard to FIGS. 3A-4B, and detect an inclination angle of a machine based on the processed data.

In certain embodiments, memory 253 may include a program enabling controller 250 to process the data using a Kalman filter. A Kalman filter is a mathematical method that may be used to determine accurate values of measurements observed over time, such as measurements taken in a time series. The Kalman filter's general operation involves two phases, a propagation or "predict" phase and a measurement or "update" phase. In the predict phase, the value estimate from the previous timestep in the time series is used to generate an a priori value estimate. In the update phase, the a priori estimate calculated in the predict phase is combined with an estimate of the accuracy of the a priori estimate (e.g., the variance), and a current measurement value to produce a refined a posteriori estimate.

Figure 3B:
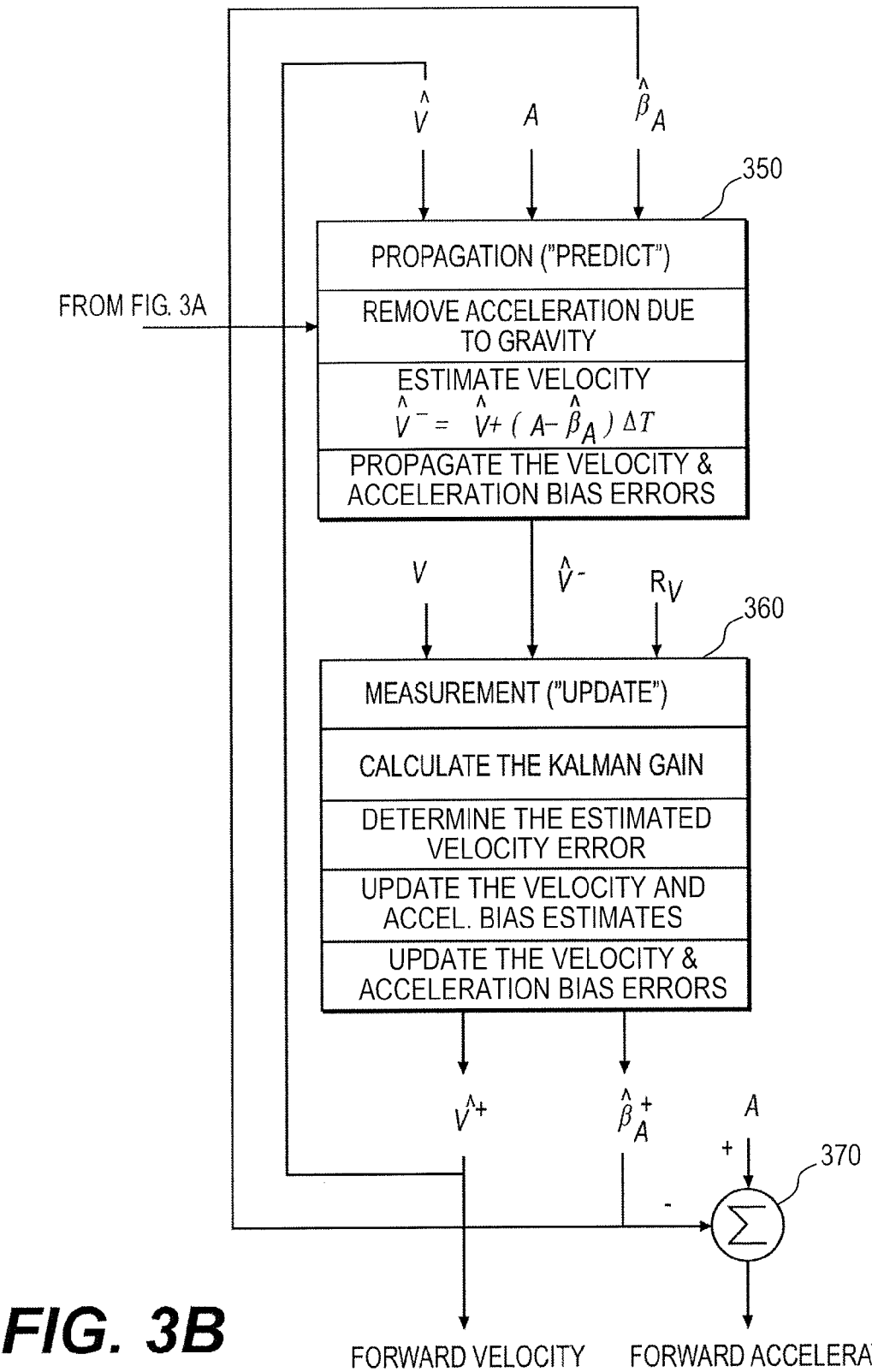

FIGS. 3A and 3B illustrate an exemplary embodiment of controller 250. Controller 250 may include an inclination angle predictor 310 an inclination angle updater 320, a measurement variance calculator 330, a summer 340, a forward velocity predictor 350, a forward velocity updater 360, and a summer 370. Although the components included in controller 250 are shown as separate components, they may be implemented in any combination of hardware and/or software. For example, in one embodiment, the components in controller 250 shown in FIGS. 3A and 3B may be implemented in the form of software stored on one or more of storage 252 and/or memory 253 that, when executed by processor 251, enable controller 250 to perform functions related to disclosed embodiments.

Inclination angle predictor 310 may be configured to calculate an a priori estimated inclination angle of the machine based on a previously estimated inclination angle. In one embodiment, inclination angle predictor 310 may be configured to determine a Kalman filter a priori estimate for an inclination angle of a machine. For example, inclination angle predictor 310 may receive an a posteriori estimated inclination angle $\hat{\theta}$ and an inclination angular rate bias estimate $\hat{\beta}_{\dot{\theta}}$ calculated by inclination angle updater 320 in a previous timestep. Inclination angle predictor 310 may also receive a measured inclination angular rate value $\dot{\theta}$ from inclination angular rate sensor 220. Inclination angle predictor 310 may use this data to calculate an a priori estimated inclination angle of the machine. For example, inclination angle predictor 310 may use linear extrapolation to calculate the a priori estimated inclination angle in accordance with the following equation:

$$\hat{\theta}^- = \hat{\theta} + (\dot{\theta} - \hat{\beta}_{\dot{\theta}})\Delta T \qquad (1)$$

where $\hat{\theta}^-$ equals the a priori estimated inclination angle, $\hat{\theta}$ equals the a posteriori estimated inclination angle calculated from a previous timestep, $\dot{\theta}$ equals the measured inclination angular rate value, $\hat{\beta}_{\dot{\theta}}$ equals the inclination angular rate bias estimate calculated from a previous timestep, and $\Delta T$ equals the time between timesteps in the Kalman filter. While a linear extrapolation method is used above in equation (1), any other method may be used to calculate the a priori estimated inclination angle, including, e.g., curve fitting analysis, regression analysis, estimates based on previously collected data, etc.

Inclination angle predictor 310 may also be configured to calculate a preliminary variance of the inclination angle. The inclination angle preliminary variance may be calculated in any way consistent with disclosed embodiments. For example, in one embodiment, the inclination angle preliminary variance may be calculated to be proportional to the inclination angular rate value, e.g., from inclination angular rate sensor 220. Inclination angle predictor 310 may be configured to output the a priori estimated inclination angle, an inclination angular rate bias, and inclination angle preliminary variance to other components, e.g., inclination angle updater 320 and/or measurement variance calculator 330.

Measurement variance calculator 330 may be configured to calculate a measurement variance of the inclination angle based on a non-gravitational acceleration of the machine and the inclination angle preliminary variance received from inclination angle predictor 310. For example, measurement variance calculator 330 may be configured to receive a forward acceleration measurement value A, which may be received from, e.g., forward acceleration sensor 240; an acceleration bias a posteriori estimate $\hat{\beta}_A^+$ calculated, e.g., by forward velocity updater 360 in a previous timestep; and the a priori inclination angle estimate and inclination angle preliminary variance calculated, e.g., by inclination angle predictor 310.

Measurement variance calculator 330 may process the received data, generate a measurement variance $R_\theta$ of the inclination angle, and send the variance to inclination angle updater 320. In one embodiment, measurement variance calculator 330 may calculate the measurement variance of the inclination angle as follows. Measurement variance calculator 330 may correct the received acceleration measurement value based on the received acceleration bias a posteriori estimate. For example, measurement variance calculator 330 may subtract the acceleration bias a posteriori estimate $\hat{\beta}_A^+$ from the acceleration measurement value A.

Measurement variance calculator 330 may then use the a priori estimated inclination angle to determine the amount of non-gravitational acceleration that is present perpendicular to the inclination axis of rotation. For example, measurement variance calculator 330 may calculate the amount of acceleration due to gravity, which may be defined by:

$$g*\sin(\hat{\theta}^-) \quad (2)$$

where g is a conventional acceleration due to gravity (e.g., approximately 9.81 m/s² or 32.19 ft/s² on Earth) and $\hat{\theta}^-$ is the a priori estimated inclination angle of the machine. Measurement variance calculator 330 may then subtract the amount of acceleration due to gravity from the estimated acceleration of the machine that was corrected based on the acceleration bias a posteriori measurement. Thus, the non-gravitational acceleration may be calculated as $$A_e - g*\sin(\hat{\theta}^-) \quad (3)$$

where $A_e$ is the estimated acceleration of the machine that was corrected based on the acceleration bias a posteriori estimate.

Measurement variance calculator 330 may then rectify the non-gravitational acceleration signal to ensure that the variance is a positive value whenever non-gravitational accelerations are present, regardless of their direction. Measurement variance calculator 330 may rectify the signal, e.g., by taking the absolute value of the non-gravitational acceleration values. Measurement variance calculator 330 may also apply a low-pass filter to the non-gravitational acceleration values to remove zero-crossings that may be present, e.g., during machine vibrations.

Measurement variance calculator 330 may also convert the non-gravitational acceleration signal to an angular error by scaling the values and limiting them based on the application and sensors being used. For example, measurement variance calculator 330 may apply a scale factor and/or a shifting factor to the values based on the application and sensors being used, and then limit the values such that the maximum value does not exceed a predetermined threshold. In one embodiment, measurement variance calculator 330 may apply a scale factor of 0.1, a shifting factor of 1, and limit the result to 10. The final result, shown in the equation below, is a degraded multiplier from 1 to 10.

$$\text{Degraded} = \text{Limit}((0.1)|A_{LPF}|+1, 10) \quad (4)$$

where $A_{LPF}$ equals the non-gravitational acceleration signal that has been rectified and processed by the low-pass filter. In another embodiment, the degraded multiplier may be calculated by squaring the non-gravitational acceleration signal, $A_{LPF}$, adding a shifting factor of 1, and limiting the result to 10.

Measurement variance calculator 330 may then multiply the degraded multiplier by the inclination angle preliminary variance calculated by inclination angle predictor 310 to generate and output a measurement variance $R_\theta$ of the inclination angle to inclination angle updater 320.

Inclination angle updater 320 may be configured to determine an a posteriori estimated inclination angle of the machine based on the a priori estimated inclination angle, the measurement variance of the inclination angle, and the measured inclination angle. For example, inclination angle updater 320 may be configured to receive a measured inclination angle $\theta$ from inclination angle sensor 210, the a priori estimated inclination angle $\hat{\theta}^-$ from inclination angle predictor 310, and the measurement variance $R_\theta$ of the estimated inclination angle from measurement variance calculator 330.

In one embodiment, inclination angle updater 320 may be configured to determine a Kalman filter a posteriori estimate for an inclination angle of a machine. For example, inclination angle updater 320 may use the measured inclination angle, the a priori estimated inclination angle, and the measurement variance of the estimated inclination angle to calculate the Kalman gain and determine the a posteriori estimated inclination angle, the a posteriori estimated inclination angular rate, and the estimated bias for each value. Inclination angle updater 320 may output the a posteriori estimated inclination angle to inclination angle predictor 310 and/or to forward velocity predictor 350 (discussed in greater detail below). Inclination angle updater 320 may also output the a posteriori estimated inclination angular rate bias to inclination angle predictor 310 and to summer 340. Summer 340 may subtract the a posteriori estimated inclination angular rate bias from the measured inclination angular rate received, e.g., from inclination angular rate sensor 220, to generate an estimated inclination angular rate, e.g., a pitch rate.

Forward velocity predictor 350 may be configured to calculate an a priori estimated velocity of the machine based on a previously estimated velocity. In one embodiment, forward velocity predictor 350 may be configured to determine a Kalman filter a priori estimate for a velocity of a machine. For example, forward velocity predictor 350 may receive an a posteriori estimated velocity $\hat{V}$ and an acceleration bias estimate $\hat{\beta}_A$ calculated by forward velocity updater 360 in a previous timestep. Forward velocity predictor 350 may also receive an acceleration value A, e.g., from forward acceleration sensor 240. Forward velocity predictor 350 may use this data to calculate an a priori estimated velocity of the machine. For example, in one embodiment, forward velocity predictor 350 may use linear extrapolation to calculate the a priori estimated velocity in accordance with the following equation:

$$\hat{V}^- = \hat{V} + (A - \hat{\beta}_A)\Delta T \quad (5)$$

where $\hat{V}^-$ equals the a priori estimated velocity, $\hat{V}$ equals the a posteriori estimated velocity from a previous timestep, A equals the acceleration value, $\hat{\beta}_A$ equals the a posteriori acceleration bias estimate from a previous timestep, and $\Delta T$ equals the time between timesteps in the Kalman filter. While a linear extrapolation method is used above in equation (5), any other method may be used to calculate the a priori estimated velocity, including, e.g., curve fitting analysis, regression analysis, estimates based on previously collected data, etc.

In certain embodiments, forward velocity predictor 350 may also be configured to receive the a posteriori estimated inclination angle from inclination angle updater 320. Forward velocity predictor 350 may use the a posteriori estimated inclination angle to calculate the amount of acceleration due to gravity using, e.g., equation (2) above, and may subtract the amount of acceleration due to gravity from the acceleration value received from forward acceleration sensor 240. Forward velocity predictor 350 may then use the resulting acceleration value as the acceleration value in equation (5) above for calculating the a priori estimated forward velocity.

Forward velocity predictor 350 may also be configured to calculate a forward velocity measurement variance. The forward velocity measurement variance may be calculated in any way consistent with disclosed embodiments. For example, in one embodiment, the forward velocity measurement variance may be calculated to be proportional to the velocity or acceleration of the machine.

Forward velocity updater 360 may be configured to determine an a posteriori estimated forward velocity of the machine based on the a priori estimated forward velocity, the forward velocity measurement variance, and the measured velocity. For example, forward velocity updater 360 may be configured to receive a measured velocity value V from velocity sensor 230, the a priori estimated forward velocity $\hat{V}^-$ from forward velocity predictor 350, and the forward velocity measurement variance $R_V$.

In one embodiment, forward velocity updater 360 may be configured to determine a Kalman filter a posteriori estimate for the forward velocity of a machine. For example, forward velocity updater 360 may use the measured forward velocity, the a priori estimated forward velocity, and the forward velocity measurement variance to calculate the Kalman gain and determine the a posteriori estimated forward velocity, the a posteriori estimated forward acceleration, and the estimated bias for each value. Forward velocity updater 360 may output the a posteriori estimated forward velocity $\hat{V}^+$ to forward velocity predictor 350. Forward velocity updater 350 may also output the a posteriori estimated forward acceleration bias $\hat{\beta}_A^+$ to measurement variance calculator 330, forward velocity predictor 350, and summer 370. Summer 370 may subtract the a posteriori estimated forward acceleration error from the measured forward acceleration A received, e.g., from forward acceleration sensor 240, to generate an estimated forward acceleration value. In certain embodiments, the estimated forward acceleration value may be sent to measurement variance calculator 330.

Figure 4A:
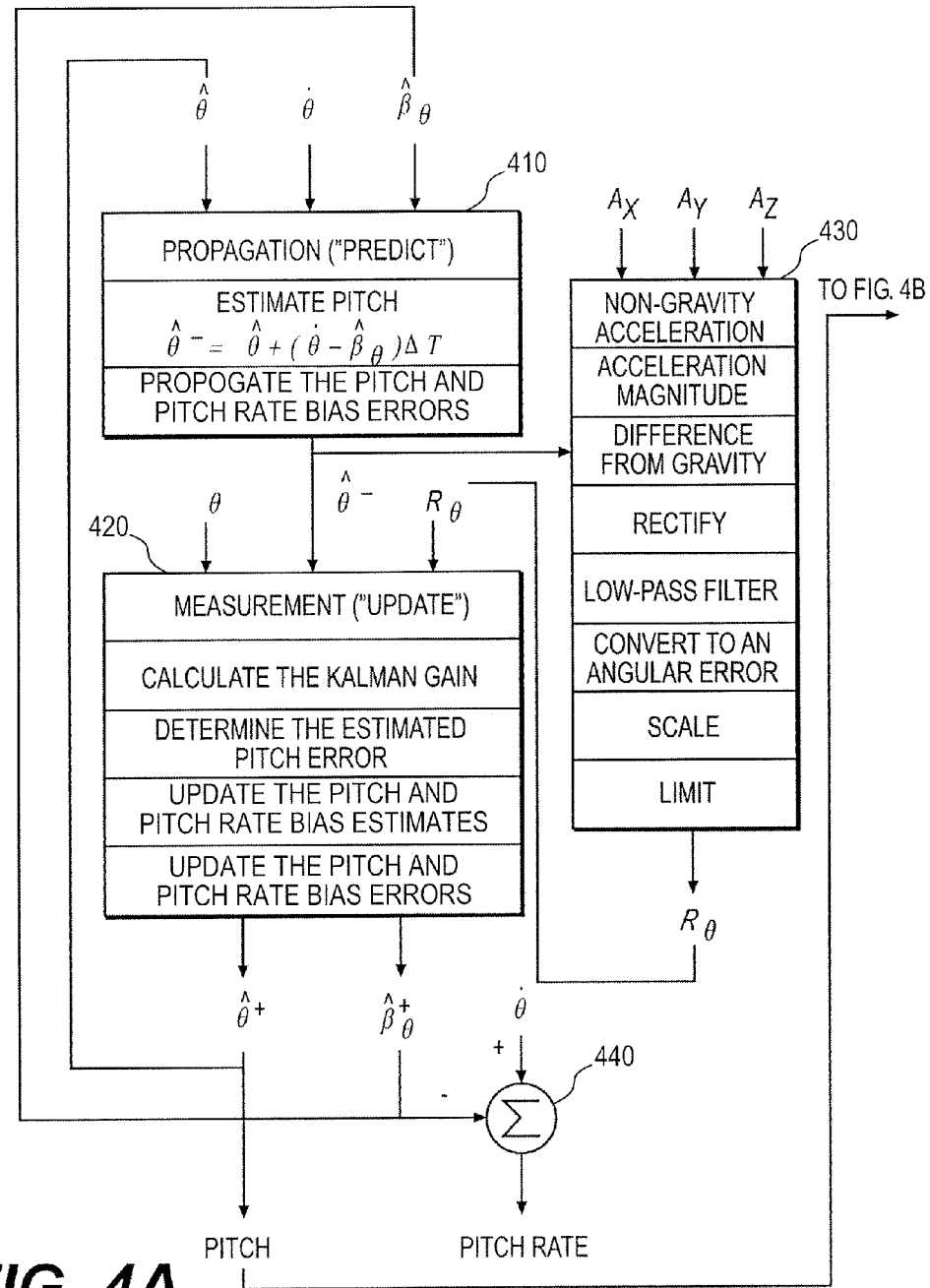
FIGS. 4A and 4B are diagrammatic illustrations of yet another exemplary disclosed inclination detection device that may be used in conjunction with the machine of FIG. 1.
Figure 4B:
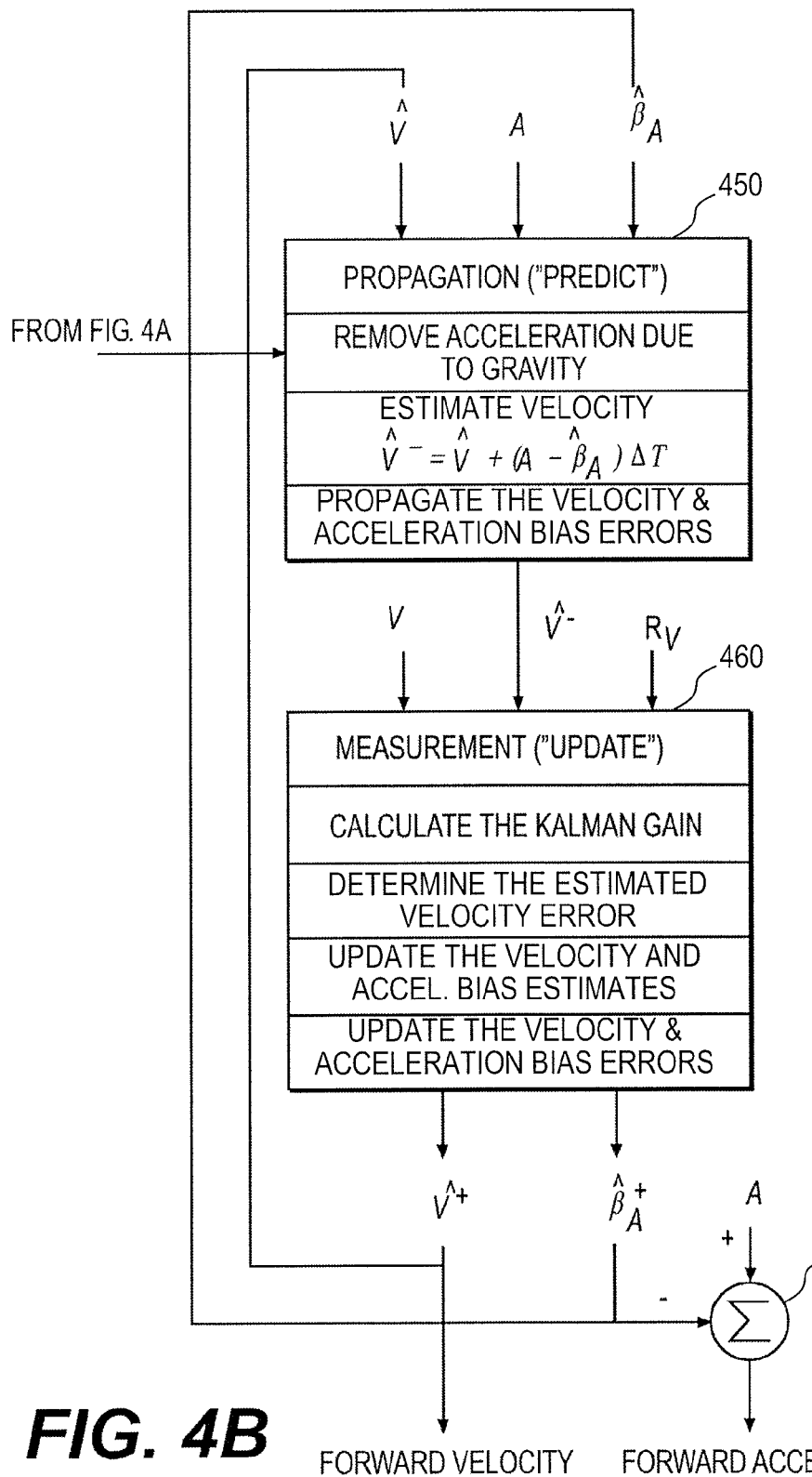

FIGS. 4A and 4B illustrate another exemplary embodiment of controller 250. Controller 250 may include an inclination angle predictor 410, an inclination angle updater 420, a measurement variance calculator 430, a summer 440, a forward velocity predictor 450, a forward velocity updater 460, and a summer 470. Although the components included in controller 250 are shown as separate components, they may be implemented in any combination of hardware and/or software. For example, in one embodiment, the components in controller 250 shown in FIGS. 4A and 4B may be implemented in the form of software stored on one or more of storage 252 and/or memory 253 that, when executed by processor 251, enable controller 250 to perform functions related to disclosed embodiments. Moreover, inclination angle predictor 410, inclination angle updater 420, summer 440, forward velocity predictor 450, forward velocity updater 460, and summer 470 may all function similarly to their similarly named counterparts in FIGS. 3A and 3B, and will not be discussed in detail.

Measurement variance calculator 430, as shown in FIG. 4A may be configured to calculate a measurement variance of the inclination angle based on a non-gravitational acceleration of the machine and the inclination angle preliminary variance received from inclination angle predictor 410. For example, measurement variance calculator 430 may be configured to receive acceleration data values along the three-dimensional axis X, Y, and Z, represented as $A_X$, $A_Y$, and $A_Z$. Measurement variance calculator 430 may also be configured to receive the a priori inclination angle estimate and inclination angle preliminary variance calculated, e.g., by inclination angle predictor 410.

Measurement variance calculator 430 may process the received data, generate a measurement variance $R_\theta$ of the inclination angle, and send the variance to inclination angle updater 420 to be used, e.g., in an update phase of a Kalman filter process. In one embodiment, measurement variance calculator 430 may calculate the measurement variance of the inclination angle as follows.

The magnitude of the acceleration vector due to gravity should be equal to g (e.g., approximately 9.81 m/s² or 32.19 ft/s²). Thus, to calculate the magnitude of the non-gravitational accelerations, measurement variance calculator 430 may calculate the magnitude of the acceleration vector resulting from the measurement of acceleration data along the X, Y, and Z axes and subtract this magnitude from g. In other words, the gravitational acceleration on machine 100 is in the shape of a sphere with a radius equal to g and any non-gravitational acceleration will cause the acceleration vector resulting from the measurement of acceleration data along the X, Y, and Z axes to differ from the gravity sphere.

For example, measurement variance calculator 430 may calculate the non-gravitational acceleration as $$A_{non-g} = (\sqrt{A_X^2 + A_Y^2 + A_Z^2} - g) \quad (6)$$

where $A_{non-g}$ is the estimated non-gravitational acceleration of the machine and $A_X$, $A_Y$, and $A_Z$ are the acceleration values measured along the X, Y, and Z axes, respectively.

Measurement variance calculator 430 may then rectify the non-gravitational acceleration signal to ensure that the variance is a positive value whenever non-gravitational accelerations are present, regardless of their direction. Measurement variance calculator 430 may rectify the signal, e.g., by taking the absolute value of the non-gravitational acceleration values. Measurement variance calculator 430 may also apply a low-pass filter to the non-gravitational acceleration values to remove zero-crossings that may be present, e.g., during machine vibrations.

Measurement variance calculator 430 may also convert the rectified non-gravitational acceleration signal to an angular error by scaling the values and limiting them based on the application and sensors being used. For example, measurement variance calculator 430 may apply a scale factor and/or a shifting factor to the values based on the application and sensors being used, and then limit the values such that the maximum value does not exceed a predetermined threshold. In one embodiment, measurement variance calculator 430 may apply a scale factor of 0.1, a shifting factor of 1, and limit the result to 10. The final result, shown in the equation below, is a degraded multiplier from 1 to 10:

$$\text{Degraded} = \text{Limit}((0.1)|A_{LPF}|+1,10) \qquad (7)$$

where $A_{LPF}$ equals the non-gravitational acceleration signal that has been rectified and processed by the low-pass filter. In another embodiment, the degraded multiplier may be calculated by squaring the non-gravitational acceleration signal, $A_{LPF}$, adding a shifting factor of 1, and limiting the result to 10.

Measurement variance calculator 430 may then multiply the degraded multiplier by the inclination angle preliminary variance calculated by inclination angle predictor 410 to generate and output a measurement variance $R_\theta$ of the inclination angle to inclination angle updater 420.

While measurement variance calculator 330 and measurement variance calculator 430 are shown in FIGS. 3A-4B as two different embodiments, measurement variance calculator 330 and measurement variance calculator 430 can also be combined in a single embodiment. For example, in one embodiment the non-gravitational acceleration signals that have been rectified and processed by a low-pass filter (identified above as $A_{LPF}$) for each of measurement variance calculator 330 and measurement variance calculator 430 may be combined, e.g., using addition, a weighted average, etc., and then the resulting combination can be scaled and limited, e.g, as discussed above with regard to equation (7). This resulting degraded multiplier can then be multiplied by the inclination angle preliminary variance to generate and output a measurement variance $R_\theta$ of the inclination angle.

Also, while embodiments discussed above measure forward velocity and acceleration as well as forward inclination angle (pitch) and inclination angular rate of change (pitch rate), one of skill in the art will understand that these embodiments may also be used to measure velocity, acceleration, inclination angle, and inclination angular rate of change in any direction. For example, certain embodiments may use a similar process to estimate roll, roll rates, yaw, and yaw rates of a machine. In one embodiment, inclination angles may be estimated in multiple directions on a single machine.

INDUSTRIAL APPLICABILITY

Figure 5:
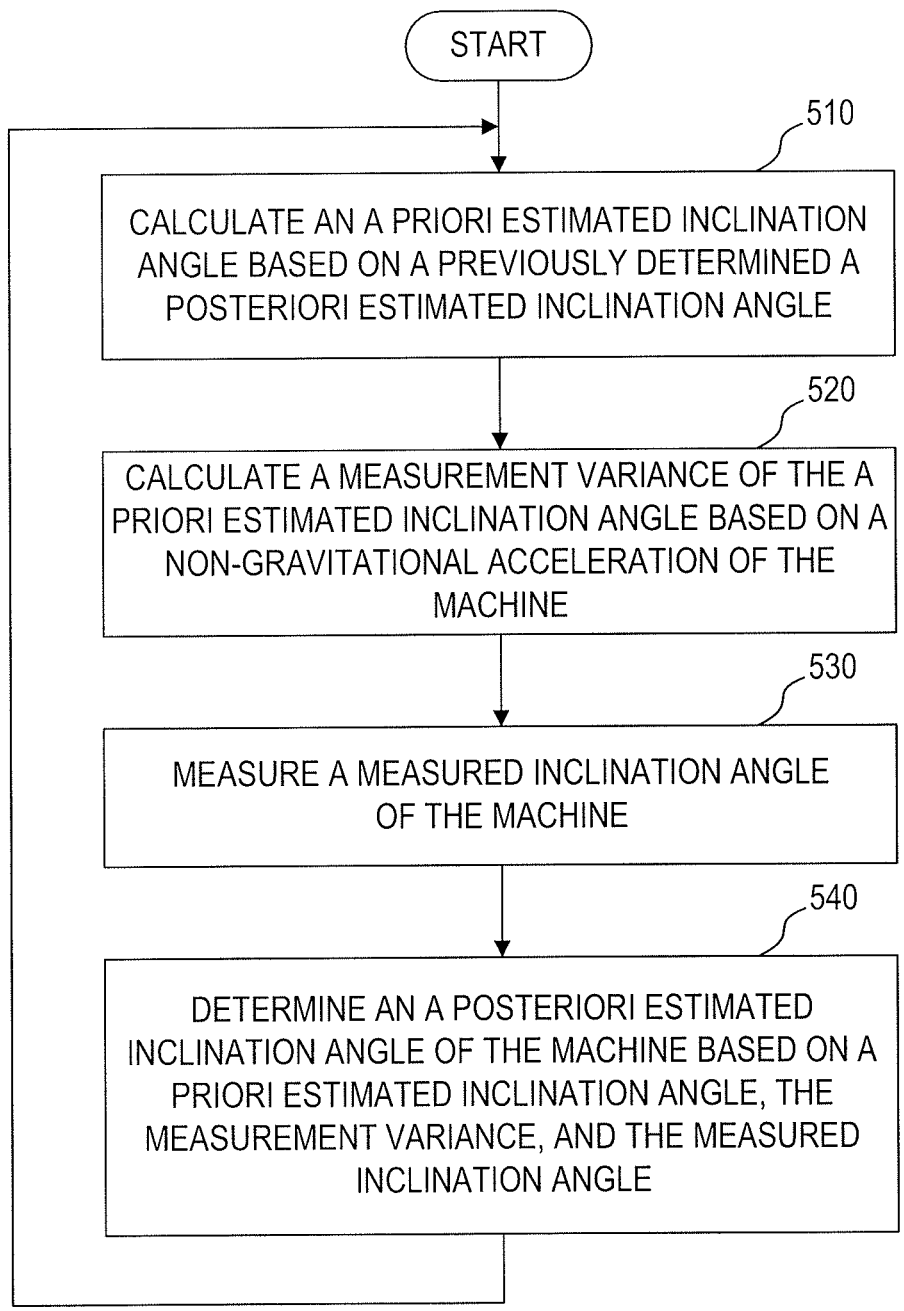
FIG. 5 is a flowchart depicting an exemplary disclosed method performed by the detection system of FIG. 2 and/or the detection devices of FIGS. 3A-4B.

The disclosed inclination detection system 110 may be applicable to any machine where accurate detection of the machine's inclination angle is desired. The disclosed inclination detection system may provide for improved detection of a machine's inclination angle through the use of a Kalman filter approach that takes into account the non-gravitational acceleration of the machine. The operation of inclination detection system 110 will now be described in connection with the flowchart of FIG. 5.

During operation of inclination detection system 110, controller 250 may calculate an a priori estimated inclination angle based on a previously determined a posteriori estimated inclination angle (step 510). For example, controller 250 may implement a predict phase of a Kalman filter to calculate an a priori estimated inclination angle based on a linear extrapolation from a previously determined a posteriori estimated inclination angle. In certain embodiments, controller 250 may also calculate an inclination angle preliminary variance.

Controller 250 may also calculate a measurement variance of the a priori estimated inclination angle based on a non-gravitational acceleration of the machine (step 520). For example, controller 250 may generate a degraded multiplier that may be multiplied by the inclination angle preliminary variance to calculate the measurement variance of the a priori estimated inclination angle. The degraded multiplier may be generated based on the non-gravitational acceleration of the machine. In one embodiment, the non-gravitational acceleration used to generate the degraded multiplier may be calculated by estimating the gravitational acceleration of the machine based on the a priori estimated inclination angle and subtracting the gravitational acceleration from the measured acceleration of the machine. In another embodiment, the non-gravitational acceleration may be calculated by measuring acceleration along three axes and subtracting the magnitude of the acceleration due to gravity from an acceleration vector generated by the three-axis measurement.

Controller 250 may also measure a measured inclination angle of the machine (step 530). For example, controller 250 may receive data from one or more inclination angle sensors, such as one or more accelerometers, pendulous-based inclinometers, and/or gyroscopes capable of measuring the inclination angle of a machine along one or more axes.

Controller 250 may then determine an a posteriori estimated inclination angle of the machine based on an a priori estimated inclination angle, the measurement variance, and the measured inclination angle (step 540). For example, controller 250 may use the a priori estimated inclination angle, the measurement variance, and the measured inclination angle as inputs to a Kalman filter update phase to generate an a posteriori estimated inclination angle of the machine. Controller 250 may also generate an a posteriori estimated forward acceleration bias. The process may return to step 510 where the a posteriori estimated inclination angle and the a posteriori estimated forward acceleration bias generated in step 540 may be used to calculate the a priori estimated inclination angle for a subsequent timestep in the Kalman filter. The process may continue to repeat in this manner until receiving instructions to stop or until new data ceases to be collected from the machine.

It will be apparent to those skilled in the art that various modifications and variations can be made to the disclosed inclination detection system. Other embodiments will be apparent to those skilled in the art from consideration of the specification and practice of the disclosed inclination detection system. It is intended that the specification and examples be considered as exemplary only, with a true scope being indicated by the following claims and their equivalents.

What is claimed is:

1. A computer-implemented method of detecting an inclination of a machine comprising:
    calculating an a priori estimated inclination angle of the machine based on a previously estimated inclination angle;
    calculating a measurement variance of the a priori estimated inclination angle based on a non-gravitational acceleration of the machine;
    measuring a measured inclination angle of the machine; and
    determining an a posteriori estimated inclination angle of the machine based on the a priori estimated inclination angle, the measurement variance of the a priori estimated inclination angle, and the measured inclination angle.

2. The computer-implemented method of claim 1, further including:
calculating the non-gravitational acceleration of the machine based on the a priori estimated inclination angle of the machine.

3. The computer-implemented method of claim 1, further including:
calculating an estimated acceleration of the machine by subtracting an acceleration bias from a measured acceleration of the machine; and
calculating the non-gravitational acceleration of the machine by subtracting, from the estimated acceleration of the machine, an acceleration due to gravity.

4. The computer-implemented method of claim 3, wherein the acceleration due to gravity is defined as $g*\sin(\hat{\theta}^-)$ where g is a conventional acceleration due to gravity and $\hat{\theta}^-$ is the a priori estimated inclination angle of the machine.

5. The computer-implemented method of claim 1, further including:
calculating the non-gravitational acceleration of the machine based on acceleration values of the machine along three axes.

6. The computer-implemented method of claim 5, wherein the non-gravitational acceleration of the machine is determined by comparing a magnitude of a vector including the acceleration values along the three axes to values on a sphere representing the magnitude of acceleration due to gravity.

7. The computer-implemented method of claim 1, wherein the a priori estimated inclination angle and the a posteriori estimated inclination angle are calculated using a Kalman filter.

8. The computer-implemented method of claim 7, wherein the measurement variance of the a priori estimated inclination angle is used as an input to the Kalman filter.

9. An inclination detection system for detecting an inclination of a machine comprising:
an inclination angle predictor configured to calculate an a priori estimated inclination angle of the machine based on a previously estimated inclination angle;
a measurement variance calculator configured to calculate a measurement variance of the a priori estimated inclination angle based on a non-gravitational acceleration of the machine;
an inclination angle sensor configured to measure a measured inclination angle of the machine;
an inclination angle updater configured to determine an a posteriori estimated inclination angle of the machine based on the a priori estimated inclination angle, the measurement variance of the a priori estimated inclination angle, and the measured inclination angle.

10. The inclination detection system of claim 9, wherein the measurement variance calculator is further configured to calculate the non-gravitational acceleration of the machine based on the a priori estimated inclination angle of the machine.

11. The inclination detection system of claim 9, wherein the measurement variance calculator is further configured to:
calculate an estimated acceleration of the machine by subtracting an acceleration bias from a measured acceleration of the machine; and
calculate the non-gravitational acceleration of the machine by subtracting, from the estimated acceleration of the machine, an acceleration due to gravity.

12. The inclination detection system of claim 9, wherein the measurement variance calculator is further configured to calculate the non-gravitational acceleration of the machine based on acceleration values of the machine along three axes.

13. The inclination detection system of claim 12, wherein the measurement variance calculator is further configured to calculate the non-gravitational acceleration of the machine by comparing a magnitude of a vector including the acceleration values along the three axes to values on a sphere representing the magnitude of acceleration due to gravity.

14. The inclination detection system of claim 9, wherein the inclination angle predictor and the inclination angle updater are included in a Kalman filter.

15. The inclination detection system of claim 14, wherein the measurement variance of the a priori estimated inclination angle is used as an input to the Kalman filter.

16. A computer-readable storage device storing instructions for determining an inclination angle of a machine, the instructions causing one or more computer processors to perform operations comprising:
calculating an a priori estimated inclination angle of the machine based on a previously estimated inclination angle;
calculating a measurement variance of the a priori estimated inclination angle based on a non-gravitational acceleration of the machine;
receiving a measured inclination angle of the machine; and
determining an a posteriori estimated inclination angle of the machine based on the a priori estimated inclination angle, the measurement variance of the a priori estimated inclination angle, and the measured inclination angle.

17. The computer-readable storage device according to claim 16, the instructions further causing the one or more computer processors to perform operations including:
calculating the non-gravitational acceleration of the machine based on the a priori estimated inclination angle of the machine.

18. The computer-readable storage device according to claim 16, the instructions further causing the one or more computer processors to perform operations including:
calculating an estimated acceleration of the machine by subtracting an acceleration bias from a measured acceleration of the machine; and
calculating the non-gravitational acceleration of the machine by subtracting, from the estimated acceleration of the machine, an acceleration due to gravity.

19. The computer-readable storage device according to claim 18, wherein the acceleration due to gravity is defined as $g*\sin(\hat{\theta}^-)$, where g is a conventional acceleration due to gravity and $\hat{\theta}^-$ is the a priori estimated inclination angle of the machine.

20. The computer-readable storage device according to claim 16, the instructions further causing the one or more computer processors to perform operations including:
calculating the non-gravitational acceleration of the machine based on acceleration values for the machine along three axes.

* * * * *